Figure 1:
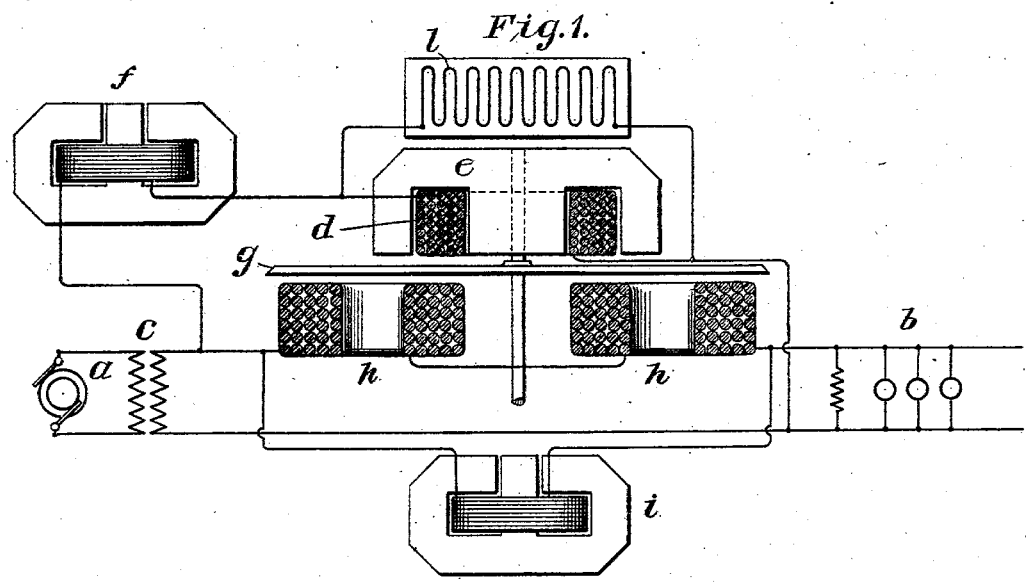

No. 757,517. PATENTED APR. 19, 1904.
E. M. TINGLEY.
METHOD OF PHASE ANGLE ADJUSTMENT.
APPLICATION FILED APR. 24, 1900.
NO MODEL.

WITNESSES:
C. L. Belcher
Birney Hines

INVENTOR
Egbert M. Tingley
BY Wesley G. Carr
ATTORNEY.

No. 757,517. Patented April 19, 1904.

UNITED STATES PATENT OFFICE.

EGBERT M. TINGLEY, OF PITTSBURG, PENNSYLVANIA, ASSIGNOR TO WESTINGHOUSE ELECTRIC & MANUFACTURING COMPANY, A CORPORATION OF PENNSYLVANIA.

METHOD OF PHASE-ANGLE ADJUSTMENT.

SPECIFICATION forming part of Letters Patent No. 757,517, dated April 19, 1904.

Original application filed May 9, 1896, Serial No. 590,841. Divided and this application filed April 24, 1900. Serial No. 14,176.

(No model.)

*To all whom it may concern:*

Be it known that I, EGBERT M. TINGLEY, a citizen of the United States, residing at Pittsburg, in the county of Allegheny and State of Pennsylvania, have invented a new and useful Improvement in Methods of Phase-Angle Adjustment, of which the following is a specification, this application being a division of my application, Serial No. 590,841, filed May 9, 1896.

My invention relates to phase-angle adjustment, and more particularly to the adjustment of the phase angle between the shunt and series fields of instruments employed for measuring the energy consumed by translating devices in alternating-current circuits.

The object of my invention is to provide a method whereby such an adjustment of the phase relation between the magnetic fields of such an instrument may be effected as will insure an accurate indication or registration whatever may be the power factor of the work-circuit.

In alternating-current-measuring instruments the operation of which is dependent upon a difference in phase between the currents in the two actuating-coils or sets of coils—such, for example, as that shown in Patent No. 531,867, granted to O. B. Shallenberger January 1, 1895—it is necessary to have a phase difference of substantially ninety degrees between the shunt and series fields for a condition of no lag in the main or work circuit in order to secure a correct indication or registration of the true energy in circuits carrying the inductive loads having different power factors or in any given circuit the power factor of which is variable. This quadrature relation may be approximated in connection with single-phase circuits by the employment of a properly-designed inductance-coil in the shunt-circuit, as described in the said Shallenberger patent. In order to secure a phase angle of exactly ninety degrees, however, an additional correcting or adjusting means is usually necessary. Such a means is set forth in Patent No. 548,231, granted to O. B. Shallenberger October 22, 1895. It consists of a closed-coil secondary located in the field of the main shunt-coil and having its magnetic circuit coincident with that of said shunt-coil, by virtue of which a component is added to the field of the shunt-coil which serves to give the desired phase angle.

I propose to secure the desired phase angle between the shunt and series fields when there is any apparent lag in the work-circuit by displacing the current in one of the field-coils with reference to that in the other or in both of said coils. The desired result may be effected in accordance with my invention by establishing a shunt to a series coil or coils having a greater time constant than the coil or coils shunted or by establishing a non-inductive shunt to the shunt-field coil or coils which shall have a lesser time constant than the coil or coils shunted or by establishing shunts of both kinds, it being understood that in every case the shunt or shunts will be so proportioned and adjusted as to properly coöperate with the field-coils.

Figure 2:
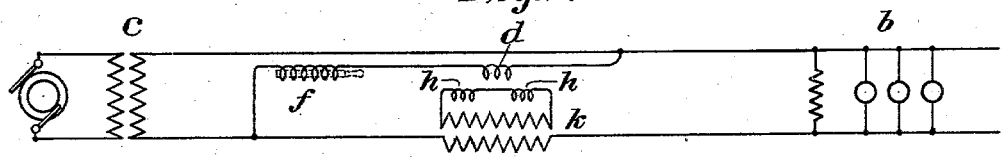
Figure 3:
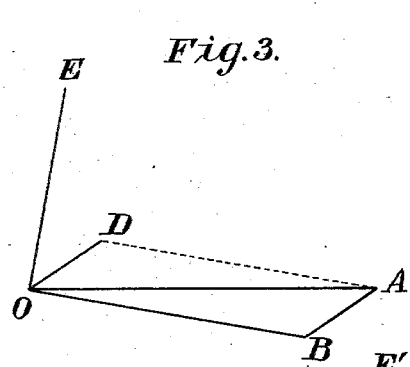
Figure 4:
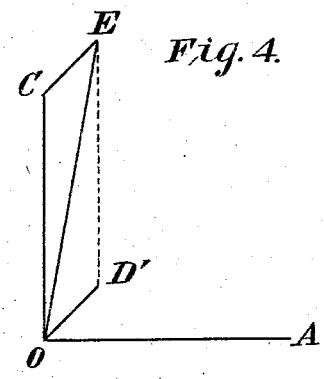
Figure 5:
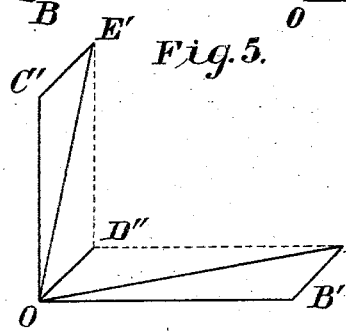

Reference being now had to the accompanying drawings, Figure 1 is a diagram of a single-phase circuit and a wattmeter constructed in accordance with my invention. Fig. 2 is a diagram of a modification of the invention. Fig. 3 is a diagram representing the various currents and phase angles involved in the apparatus when either the inductive shunt to the series coil or the series converter is employed. Fig. 4 is a diagram similar to Fig. 3, illustrating the phase adjustment by means of a non-inductive shunt to the shunt-coil; and Fig. 5 is a similar diagram, illustrating the phase adjustment by means of both inductive and non-inductive shunts.

Reference being now had to Fig. 1 of the drawings, $a$ is an alternating-current generator for supplying energy to the translating devices $b$ either directly or through a transformer $c$. $d$ is one of the actuating-coils of the meter provided with the magnetic core $e$ and connected across the work-circuit. The circuit of this coil $d$ includes an inductance-coil $f$ in order to retard the shunt-current with reference to the impressed electromotive force. $g$ is the rotatable armature of the meter, which is preferably in the form of a disk, as indicated. $h\ h$ are two coils connected in series in the work-circuit and located on the opposite side of the disk from the coil $d$. While two of these coils are shown, a single coil may be employed, if desired, provided it is properly located with reference to the coil $d$.

The construction thus far described when employed in connection with the necessary registering or indicating and retarding devices is suitable for determining the amount of electrical energy consumed in the work-circuit, provided there is no inductive load on such circuit. It is found to be practically impossible, however, to produce the ninety-degree relation between the impressed electromotive force and the current in the shunt-coil of the meter that is desired in order to secure accurate indication or registration for different inductive loads without the employment of some additional phase-adjusting means. Such a means is shown in Fig. 1 and comprises an inductive resistance $i$, located in shunt to the series coil or coils of the meter, and a non-inductive resistance $l$, in shunt to the coil $d$. The inductive resistance $i$ is of such proportions as to provide a lagging component, and thus advance the current in the series coils a certain amount, and the non-inductive shunt $l$ is of such proportions as to provide a leading component, the two combining to produce the quadrature relation desired. The same result may be secured by employing one of these shunts if it is of the proper character and proportions, and therefore I do not desire to limit my invention in this regard.

In place of the inductive resistance $i$ I may also employ a suitably designed and proportioned converter, the primary of which is connected in series in the work-circuit. Such a converter is shown at $k$ in Fig. 2.

The relation of the various currents and phase angles involved in the apparatus when the inductive shunt to coils $h\ h$ or the series converter of Fig. 2 is employed is shown in Fig. 3, in which line O E represents at a given instant the shunt-current; line O A, the current in the main circuit; line O D, which is equal and parallel to line B A, the current in the inductive shunt (shown in Fig. 1) and also the magnetizing-current for the core of the series converter. (Shown in Fig. 2.) The line O B, which constitutes one side of the parallelogram constructed on lines O A and O D, therefore represents the current in the series coils, which is ninety degrees from the current in the shunt-coil. (Represented by line O E.) The angle A O B may be termed the "angle of compensation," since it represents the element of correction applied to the series current. The same result as regards phase-angle correction may be secured by means of the non-inductive shunt $l$ applied to the terminals of the shunt-coil $d$. This non-inductive shunt obviously has no effect upon the current in the series coils, such as that produced by the inductive shunt of Fig. 1 and the series converter of Fig. 2; but it serves to provide a component in advance of that in the shunt-coil, and thus to retard the current in the shunt-coil with reference to that in the series coils the necessary amount to give the quadrature relation, as indicated in Fig. 4, in which line O A represents at a given instant the current in the series coils of the meter; line O E, the main shunt-current; line C E, which is equal and parallel to line O D′, the current in the non-inductive shunt $l$, and line O C the current in the shunt-coil of the meter. The angle A O C is the phase angle between the current in the shunt-coil and the current in the series coils, this angle being ninety degrees, as desired. The angle C O E is the angle of compensation in this instance.

Instead of employing either an inductive shunt to the series coils or a non-inductive shunt to the shunt-coil of the meter alone both of these correcting means may be employed. When both shunts are employed, the desired adjustment is obviously effected partially by one shunt and partially by the other, as is indicated in Fig. 5, in which line O E′ represents the main shunt-circuit; line O A′, the current in the main circuit; lines B′ A′ and O D″, the current in the inductive shunt $i$, and lines C′, E′, and O D″ the current in the non-inductive shunt $l$. By reason of the non-inductive shunt $l$ the shunt-current is retarded, so as to be represented as regards angular position by line O C′, and the series current is advanced by the inductive shunt $i$ to a position represented by the line O B′, the angle B′ O C′ being ninety degrees, as desired. As illustrated by the diagram, each shunt makes one-half of the phase adjustment; but it is obvious that the angular adjustment effected by either may be anything desired, provided the adjustment effected by the two amounts to ninety degrees.

The correct proportioning of the coils will obviously depend upon the conditions to be met in any particular case and may be readily determined by any one skilled in the art.

While my invention is illustrated and described in connection with an instrument for measuring electrical energy and is primarily intended for use in such relations, I do not desire or intend to limit it as regards the particular apparatus with which it is employed.

I claim as my invention—

1. In the method of measuring the electrical energy of a single-phase circuit, the improvement which consists in establishing by currents from the single source supplying the energy to be measured, two periodic magnetic fluxes, one proportional to the electromotive force of the supply-circuit and the other proportional to the current flowing to the translating devices, said fluxes having a phase difference equal to an angle differing from ninety degrees by the angle of lag in the work-circuit and acting inductively upon a closed circuited armature, and maintaining the phase difference of said fluxes by the action of currents shunted around part or all of the energizing-coils and outside their magnetic fields substantially as described.

2. In the method of measuring the energy of a single-phase circuit, the improvement which consists in establishing by currents from the single source supplying the energy to be measured, two periodic magnetic fluxes, one proportional to the electromotive force of the supply-circuit and retarded behind the supplied current, and the other proportional to the quantity of said current and advanced relatively to the main current by an angle equal to the complement of the angle of retardation of said other flux, minus the angle of lag of the work-circuit, and acting inductively upon a closed circuited armature, substantially as described.

3. The method of increasing the phase angle between the currents in two independent field-coils which consists in shunting one of said coils by an inductive resistance the self-induction of which is greater than that of the said coil.

4. The method of producing a desired phase angle between two magnetic fields which consists in lagging the current in one of the field-producing coils by introducing inductive resistance directly into its circuit and advancing the current in the other field-producing coils by subjecting the same to the action of an inductive shunt.

5. The method of producing a quadrature relation between two coils, one in series relation with a work-circuit, and the other in a shunt or shunt relation to the work-circuit, which consists in effecting a lag of the phase of the magnetic flux of one coil and shunting one of the coils by a shunt having a different time constant than that of the said coils.

In testimony whereof I have hereunto subscribed my name this 20th day of April, 1900.

EGBERT M. TINGLEY.

Witnesses:
WESLEY G. CARR,
BIRNEY HINES.